(12) United States Patent
Ogasawara et al.

(10) Patent No.: US 10,597,333 B2
(45) Date of Patent: Mar. 24, 2020

(54) PROCESS FOR PRODUCING CERAMIC FIBER-REINFORCED COMPOSITE MATERIAL

(71) Applicant: JAPAN AEROSPACE EXPLORATION AGENCY, Chofu-shi, Tokyo (JP)

(72) Inventors: Toshio Ogasawara, Chofu (JP); Takuya Aoki, Chofu (JP); Masaki Kotani, Chofu (JP)

(73) Assignee: JAPAN AEROSPACE EXPLORATION AGENCY, Tokyo (JP)

( * ) Notice: Subject to any disclaimer, the term of this patent is extended or adjusted under 35 U.S.C. 154(b) by 648 days.

(21) Appl. No.: 15/016,195

(22) Filed: Feb. 4, 2016

(65) Prior Publication Data

US 2016/0145158 A1   May 26, 2016

Related U.S. Application Data

(62) Division of application No. 13/743,293, filed on Jan. 16, 2013, now abandoned.

(30) Foreign Application Priority Data

Jan. 18, 2012  (JP) ................... 2012-007738

(51) Int. Cl.
 *C04B 35/80*  (2006.01)
 *C04B 35/628*  (2006.01)
 (Continued)

(52) U.S. Cl.
 CPC ........ *C04B 35/80* (2013.01); *C04B 35/58092* (2013.01); *C04B 35/62863* (2013.01);
 (Continued)

(58) Field of Classification Search
 CPC .............. C04B 35/80; C04B 35/58092; C04B 35/62863; C04B 35/806
 See application file for complete search history.

(56) References Cited

U.S. PATENT DOCUMENTS

| | | | | |
|---|---|---|---|---|
| 5,552,352 | A | * | 9/1996 | Brun .................... C04B 35/573 428/368 |
| 5,952,100 | A | * | 9/1999 | Corman ................. B32B 18/00 428/368 |
| 5,955,391 | A | * | 9/1999 | Kameda ............... C04B 35/573 204/192.28 |
| 6,261,981 | B1 | * | 7/2001 | Dietrich ............... C04B 35/573 264/658 |

(Continued)

FOREIGN PATENT DOCUMENTS

| EP | 0 519 641 A1 | 12/1992 |
|---|---|---|
| JP | 10-59780 A | 3/1998 |

(Continued)

OTHER PUBLICATIONS

Figure 2 Provided by the Examiner in the Non-Final Office Action dated Oct. 5, 2015 of the Parent U.S. Appl. No. 13/743,293. (Note: it is categorized as a "Non Patent Literature" reference).

*Primary Examiner* — Colleen P Dunn
*Assistant Examiner* — Jeremy C Jones
(74) *Attorney, Agent, or Firm* — Cheng Law Group, PLLC

(57) ABSTRACT

To provide a process for producing a ceramic fiber-reinforced composite material, which suppresses the deterioration of an interface layer, improves mechanistic properties and has excellent durability even under a high temperature, even ceramic fibers formed of silicon carbide fibers are used, without complicating the production steps. To obtain a ceramic fiber-reinforced composite material, by melt-infiltrating a composite material substrate obtained by forming ceramic fibers, formed of silicon carbide fibers and having an amorphous structure, into a composite with a matrix formed of an inorganic substance, with an alloy having a composition that is constituted by a disilicide of at least one or more transition metal among transition metals selected from scandium, yttrium, titanium, zirconium, hafnium, and tantalum, and silicon as the remainder, and having the silicon content ratio of 66.7 at % or more and less than 90.0 at %.

3 Claims, 2 Drawing Sheets

(51) Int. Cl.
*C04B 41/00* (2006.01)
*C04B 35/58* (2006.01)
*C04B 41/85* (2006.01)
*C04B 41/50* (2006.01)
*C22C 49/14* (2006.01)

(52) U.S. Cl.
CPC .. *C04B 35/62873* (2013.01); *C04B 35/62884* (2013.01); *C04B 35/62894* (2013.01); *C04B 35/806* (2013.01); *C04B 41/009* (2013.01); *C04B 41/5096* (2013.01); *C04B 41/85* (2013.01); *C04B 2235/3826* (2013.01); *C04B 2235/3891* (2013.01); *C04B 2235/424* (2013.01); *C04B 2235/428* (2013.01); *C04B 2235/48* (2013.01); *C04B 2235/608* (2013.01); *C04B 2235/614* (2013.01); *C04B 2235/616* (2013.01); *C04B 2235/80* (2013.01); *C04B 2235/96* (2013.01); *C04B 2235/9684* (2013.01); *C22C 49/14* (2013.01); *F05D 2300/6033* (2013.01)

(56) References Cited

U.S. PATENT DOCUMENTS

| | | | |
|---|---|---|---|
| 6,576,076 B1* | 6/2003 | Tani | C04B 35/571 156/89.26 |
| 6,805,034 B1* | 10/2004 | McCormick | C04B 35/565 264/603 |
| 7,297,368 B2* | 11/2007 | Williams | C04B 35/56 427/249.1 |
| 2005/0244581 A1* | 11/2005 | Thebault | C04B 35/573 427/249.2 |
| 2007/0292690 A1* | 12/2007 | Schmidt | C04B 35/571 428/408 |

FOREIGN PATENT DOCUMENTS

| | | |
|---|---|---|
| JP | 10-167831 A | 6/1998 |
| JP | 10-259070 A | 9/1998 |
| JP | 11-263668 A | 9/1999 |

* cited by examiner

PROCESS FOR PRODUCING CERAMIC FIBER-REINFORCED COMPOSITE MATERIAL

CROSS REFERENCE TO RELATED APPLICATIONS

This application is a Divisional Application of patent application Ser. No. 13/743,293 filed on Jan. 16, 2013, which is based on Japanese Patent Application No. JP2012-007738 filed on Jan. 18, 2012, the entire contents of which are hereby incorporated by reference.

BACKGROUND

Technical Field

The present invention relates to a process for producing a ceramic fiber-reinforced composite material that is formed by infiltrating the entirety or a part of pores that are present in a composite material substrate obtained by forming ceramic fibers into a composite with a matrix (base material) formed of an inorganic substance, with an infiltrating material, and can be used at a high temperature, and to a ceramic fiber-reinforced composite material.

Related Art

Generally, in ceramic fiber-reinforced composite materials, a special interface layer is required for an interface between ceramic fibers and a matrix so as to control the adhesion strength between the ceramic fibers and matrix, and interface layers of hexagonal boron nitride (h-BN) or carbon (c) are most frequently used.

However, oxidation by water vapor in a temperature range of 800 to 1,000° C. generates in boron nitride and oxidation by air in a temperature range of 800° C. or more generates in carbon, to thereby inhibit the high temperature properties of the ceramic fiber-reinforced composite material.

Furthermore, formation of a matrix in a ceramic fiber-reinforced composite material is conducted by a chemical vapor deposition process (CVD), a chemical vapor infiltration process (CVI), a ceramic precursor infiltration-pyrolysis process (PIP), a reactive sintering process (RS) or the like, but pores (voids) remain in either process.

For example, in the infiltration-pyrolysis process of a ceramic precursor, decrease of weight and volume generates in the process of forming a ceramic by heat decomposition of the precursor.

In the chemical vapor deposition process and chemical vapor infiltration process, the diffusion of reaction gas into the inside of a preform of ceramic fibers is inhibited according to the growth of a matrix, and thereby pores remain.

In the reactive sintering process, remaining of pores in accordance with the volumetric shrinkage during reactive sintering occurs.

Due to such phenomena, it is impossible to completely fill a matrix in a ceramic fiber-reinforced composite material, and generally, pores of at least several percent by volume to several ten percent by volume or more remain.

These pores become entry pathways for gases (air and water vapor) that oxidize the interface layer to thereby cause decrease of the adhesion strength between the ceramic fibers and matrix, and the residual pores themselves become one of the causes of the deterioration of the mechanistic properties of the ceramic fiber-reinforced composite material.

In order to solve these problems, for example, a technique including infiltrating pores of a ceramic-based composite material with glass to thereby suppress oxidation at an interface layer is known (see Japanese Patent Application Laid-Open (JP-A) No. 10-259070 and the like).

Furthermore, a technique including forming a silicon carbide matrix by a reactive sintering process by infiltrating a preform of ceramic fibers with a carbon powder, and melt-infiltrating the preform with metallic silicon, to thereby suppress the deterioration of an interface layer is known (see JP-A Nos. 10-59780, 11-263668 and the like).

Furthermore, a technique including obtaining a silicon carbide fibers/silicon-silicon carbide composite material by molding a molded article including silicon carbide fibers and silicon carbide particles by using metallic silicon as a binder to thereby suppress the deterioration of an interface layer and improve the mechanistic properties is known (see JP-A No. 10-167831 and the like).

SUMMARY

However, the technique known in the above-mentioned JP-A No. 10-259070 has a problem that, since the glass is chemically unstable in a temperature range of 1,000° C. or more, the material is deteriorated over time by use in that temperature range and thus has low durability.

Furthermore, the technique also has a problem that the material cannot be applied in a high temperature range over 1,300° C. since melting and vaporization of the glass generate.

The techniques known in the above-mentioned JP-A Nos. 10-59780 and 11-263668 have a problem that it is necessary to form a reaction protective layer by a chemical vapor deposition process (CVD process) or the like on the surface of the ceramic fibers so as to prevent the deterioration of the ceramic fibers and interface layer due to direct contact of the molten silicon with the ceramic fibers or interface layer during the production process, thereby the production steps become complex.

Furthermore, in melt infiltration of silicon, it is necessary to heat to a temperature equal to or more than 1,414° C. that is the melting point of silicon, generally to 1450° C. or more, but there is a problem that heat decomposition occurs in this temperature range in many ceramic fibers, and thus the strength of the ceramic fibers is significantly decreased.

For example, it is known that, when a heat treatment of amorphous silicon carbide (SiC) fibers, amorphous alumina fibers or the like, which are generally used as ceramic fibers, is conducted at a temperature equal to or more than the production temperature of these ceramic fibers, heat decomposition proceeds and the mechanistic properties are significantly inhibited.

Therefore, in the case when silicon is melt-infiltrated, there was a problem that special ceramic fibers that are excellent in chemical stability at a high temperature and extremely expensive (for example, Tyranno SA fibers (trade name: Ube Industries, Ltd.) and Hi-Nicalon Type S fibers (trade name: Nippon Carbon Co., Ltd.), which are crystalline silicon carbide fibers, and the like) may be used.

The technique known in the above-mentioned JP-A No. 10-167831 has a problem that the strength property of the composite material significantly decreases in a temperature range over 1,300° C. since the strength property significantly depends on the metallic silicon as a binder.

Therefore, the present invention aims at providing a ceramic fiber-reinforced composite material obtained by forming ceramic fibers into a composite with a matrix formed of an inorganic substance, which suppresses the deterioration of an interface layer, improves mechanistic properties and has excellent durability even under a high temperature, even general ceramic fibers are used, without complicating the production steps.

A first aspect of the invention solves the above-mentioned problem by providing a process for producing a ceramic fiber-reinforced composite material that is formed by infiltrating the entirety or a part of pores that are present in a composite material substrate obtained by forming ceramic fibers into a composite with a matrix formed of an inorganic substance, with an infiltrating material, wherein the ceramic fibers are formed of silicon carbide fibers and have an amorphous structure, the infiltrating material is an alloy having a composition that is constituted by a disilicide of at least one or more transition metal among transition metals selected, from scandium, yttrium, titanium, zirconium, hafnium, vanadium, niobium and tantalum, and silicon as the remainder, has a silicon content ratio (including the silicon in the transition metal disilicide) of 66.7 at % or more and 95.0 at % or less, and gives a melting point that is lower than that of a single body of silicon, and the process comprises melt-infiltrating the pores that are present in the composite material substrate with the infiltrating material at a temperature that is equal to or more than the melting point of the alloy as the infiltrating material and that is 1,400° C. or less.

A second aspect of the invention solves the above-mentioned problem by providing the entirety or a part of the pores that are present in the composite material substrate with free carbon prior to the melt infiltration, and reacting the alloy as the infiltrating material and the free carbon in the pores during the melt infiltration to generate silicon carbide and a carbide of the transition metal, besides the constitution of the process for producing a ceramic fiber-reinforced composite material of the first aspect.

A third aspect of the invention solves the above-mentioned problem by that the melting point of the residual alloy that is solidified in the pores after the melt infiltration is higher than the melting point of the alloy as the infiltrating material prior to the melt infiltration, besides the constitutions of the processes for producing a ceramic fiber-reinforced composite material of the first and second aspects.

Fifth, sixth, seventh and eighth aspects of the invention solve the above-mentioned problem by that the above-mentioned ceramic fibers are silicon carbide fibers, besides the constitutions of the processes for producing a ceramic fiber-reinforced composite material of the first, second, third and fourth aspects.

According to the process for producing a ceramic fiber-reinforced composite material of the first aspect, the melting point of the alloy as the infiltrating material becomes lower than 1,414° C. that is the melting point of silicon, by adjusting the silicon content ratio (including the silicon in the transition metal disilicide) of the alloy to 66.7 at % or more and 95.0 at % or less, and with a temperature being set at a temperature that is equal to or more than the melting point of the alloy as the infiltrating material and that is 1,400° C. or less, the temperature of the alloy as the infiltrating material during the melt infiltration can be suppressed to be low during the melt infiltration treatment of the infiltrating material.

By this way, exposure of the ceramic fibers to a high temperature for a long time can be suppressed, and decrease in the strength and durability of the ceramic fibers by heat can also be suppressed without complicating the production steps, even ceramic fibers, formed of silicon carbide fibers and having an amorphous structure, are used, and thus a ceramic fiber-reinforced composite material having excellent durability even under a high temperature can be provided.

Furthermore, the alloy as the infiltrating material has a property that the melting point of the alloy simply decreases from 1,414° C. that is the melting point of silicon as the silicon content ratio decreases from 100 at %, and becomes the lowest at 85 to 95 at %, and the melting point simply increases in the range of 66.7 at % or more as the content ratio further decreases, and the melting points of the alloy are relatively linear at the both sides of the lowest point and do not have extreme flexion point and singular point. Therefore, the melting point of the alloy during the melt infiltration treatment can be stably retained in a region lower than the melting point of silicon.

Furthermore, by forming the ceramic fibers into a composite with a matrix formed of an inorganic substance in the step prior to the melt infiltration of the infiltrating material, the effect of the direct contact of the alloy as the molten infiltrating material with the ceramic fibers and interface layer can be completely prevented.

Moreover, since the treatment is a sealing treatment on the pores that are present in the composite material substrate, heat treatment distortion of the ceramic fibers which accompanies the melt infiltration of the alloy as the infiltrating material generates significantly little, and thus the obtained ceramic fiber-reinforced composite material has a high dimensional accuracy.

Furthermore, the pores that are present in the composite material substrate are sealed by the silicon alloy as the infiltrating material, and the like, and thus entry of gases (air and water vapor) that oxidize the interface layer of the composite material substrate, thereby the oxidation resistance at the interface is significantly improved.

Furthermore, since a large amount of the transition metal disilicide remains together with metallic silicon after the infiltration, much metal oxide is generated even oxygen and water vapor that are present in the environment enter, and thus more excellent oxidation resistance is shown than in the case when only silicon dioxide is generated. Therefore, an excellent effect is exerted also from the viewpoint of improvement of oxidation resistance.

According to the constitution of the second aspect, since the silicon carbide and a carbide of the transition metal are generated on the interface regions between the infiltrating material and pores during the melt infiltration of the infiltrating material, the carbides function as a reaction protective layer for the interface region to thereby suppress the deterioration of the interface layer and improve the mechanistic properties of the ceramic fiber-reinforced composite material.

Furthermore, since the silicon carbide and carbide of the transition metal are generated, the amount of the residual alloy that remains after the solidification is decreased, and thus the mechanistic properties can be improved.

In addition, it becomes possible to change the ratio of the silicon and other transition metal in the residual alloy that remains after the solidification from the ratio prior to the infiltration, by utilizing the difference in the generation velocities of the silicon carbide and the carbide of the transition metal according to temperature conditions.

According to the constitutions of the third and fourth aspects, it becomes possible to accommodate up to the heat resistance limit of the composite material substrate itself without being affected by the melting point of the residual alloy that remains after the solidification in the practical use of the ceramic fiber-reinforced composite material, by increasing the melting point of the residual alloy that remains after the solidification by changing the ratio of the silicon and other transition metal in the residual alloy.

According to the constitutions recited of the fifth, sixth, seventh and eighth aspects, the interface regions between the pores in the composite material substrate and the infiltrating material are reinforced more, thereby the deterioration of the interface layer is suppressed more and the mechanistic properties of the ceramic fiber-reinforced composite material are improved more.

DETAILED DESCRIPTION

Figure 1:
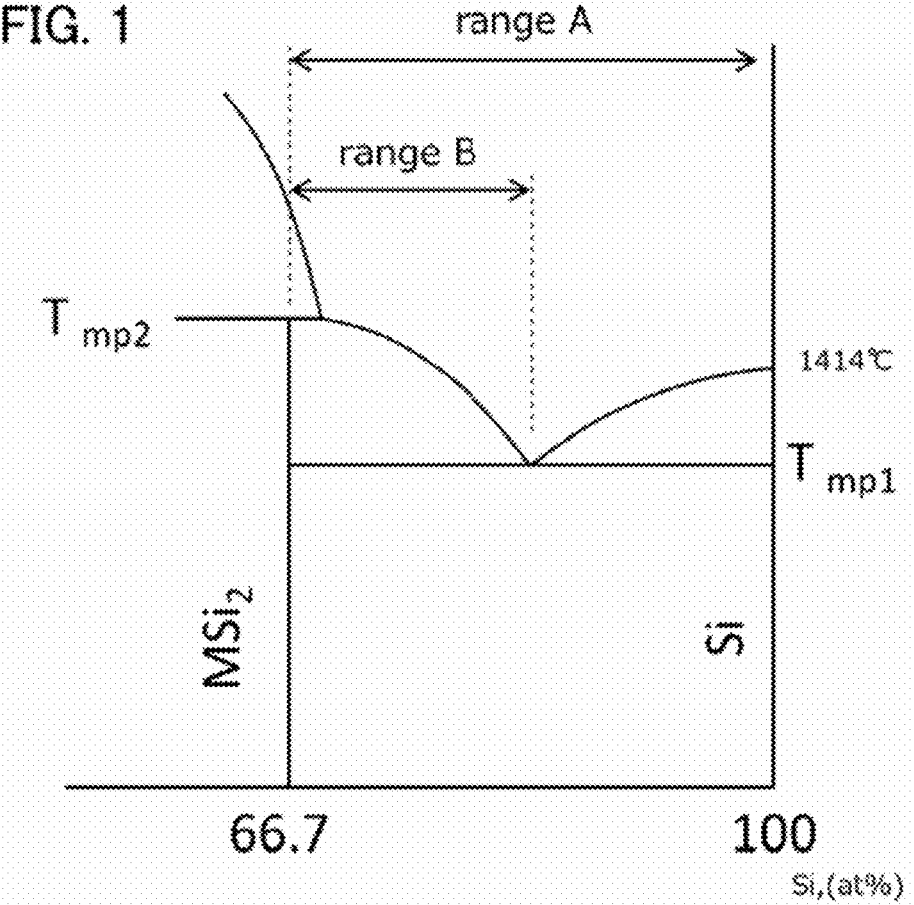
FIG. 1 is the phase diagram (schematic view) of an exemplary embodiment of the alloy as the infiltrating material used in the present invention.

The specific embodiment of the process for producing a ceramic fiber-reinforced composite material of the present invention may be any one as long as it is a process for producing a ceramic fiber-reinforced composite material that is formed by infiltrating the entirety or a part of pores that are present in a composite material substrate obtained by forming ceramic fibers into a composite with a matrix formed of an inorganic substance, with an infiltrating material, wherein the ceramic fibers are formed of silicon carbide fibers and have an amorphous structure, the infiltrating material is an alloy having a composition that is constituted by a disilicide of at least one or more transition metal among transition metals selected from scandium, yttrium, titanium, zirconium, hafnium, vanadium, niobium and tantalum, and silicon as the remainder, has a silicon content ratio (including the silicon in the transition metal disilicide) of 66.7 at % or more and 95.0 at % or less, and gives a melting point that is lower than that of a single body of silicon, and the process includes melt-infiltrating the pores that are present in the composite material substrate with the infiltrating material at a temperature that is equal to or more than the melting point of the alloy as the infiltrating material and that is 1,400° C. or less.

Namely, the ceramic fiber-reinforced composite material according to the present invention is obtained by pre-forming a composite material base material obtained by forming ceramic fibers, which are formed of silicon carbide fibers and have an amorphous structure, as reinforcing fibers into a composite with an oxide or an inorganic substance such as carbon as a matrix (base material), and melt-infiltrating pores or voids that remain in the composite material substrate with a transition metal disilicide/silicon alloy as the infiltrating material.

The composite material substrate is preformed by forming a preform of ceramic fibers into a composite with an inorganic material as a matrix (base material) by a chemical vapor deposition process (CVD), a chemical vapor infiltration process (CVI), a ceramic precursor infiltration-pyrolysis process (PIP), a reactive sintering process (RS) or the like.

As the inorganic substance that forms the matrix, carbon, a nitride, a carbide, an oxide, a phosphate, a boride, crystallized glass or the like can be applied.

The ceramic fibers can be applied to either long fibers or short fibers, and as reinforced forms of the preforms thereof, various states of arrangement such as unidirectional reinforcement, woven fabric lamination, three-dimensional woven fabric and woven fabric lamination/suturation can be applied.

In order to react the melt-infiltrated transition metal disilicide/silicon alloy and the free carbon in the pores to generate carbides, as processes for providing free carbon to the inside of the pores in the composite material substrate prior to the infiltration, there are many techniques such as a chemical vapor deposition process (CVD), a chemical vapor infiltration process (CVI), an infiltration-pyrolysis process (PIP) for a carbon precursor resin and a process for slurry infiltration of a carbon powder, and the free carbon as formed can also have various forms such as amorphous carbon, crystalline carbon, graphite, carbon nanotube and graphene.

A schematic drawing of a representative phase diagram of the transition metal disilicide/silicon alloy as the infiltrating material is shown in FIG. 1.

Here, $T_{mp1}$ is the temperature at which the melting point of the silicon alloy is the lowest, and $T_{mp2}$ is the melting point of the transition metal disilicide, and a predetermined component ratio within the composition range A is used as the composition of the transition metal disilicide/silicon alloy in the present invention.

These transition metal disilicide/silicon alloys have significant features that the transition metal disilicides have melting points ($T_{mp2}$) that are higher than the melting point of silicon (1,414° C.), the transition metal disilicide/silicon alloys have melting points that are lower than the melting point of silicon (1,414° C.), and the like.

The features of the transition metal disilicide/silicon alloys in a binary system, which are summarized for every transition metal, are shown in the following Table 1.

TABLE 1

|  | Lowest melting point (° C.) | Amount of silicon (at %) (at lowest melting point) | Melting point of disilicate (° C.) | Specific gravity of transition metal (g/cc) |
|---|---|---|---|---|
| None | 1414 |  |  |  |
| Scandium | 1000 | 84-86 | (1230) | 3.0 |
| Yttrium | 1260 | 85-87 | 1850 | 4.5 |
| Titanium | 1330 | 84-86 | 1478 | 4.5 |
| Zirconium | 1370 | 87-89 | 1620 | 6.5 |
| Hafnium | 1330 | 91-93 | 1543 | 13.3 |
| Vanadium | 1400 | 95-97 | 1677 | 6.0 |
| Niobium | 1400 | 96-98 | 1940 | 8.6 |
| Tantalum | 1375 | 92-94 | 2200 | 16.7 |

In general, an alloy having a low lowest melting point and containing a transition metal disilicide having a high melting point is desirable, and it is found that titanium, zirconium and hafnium are preferable.

In vanadium, niobium and tantalum, the transition metal disilicide has a high melting point, whereas the transition metal disilicide/silicon alloy has a slightly high melting point. Conversely, in the cases of scandium and yttrium, the transition metal disilicide/silicon alloy has a low melting point, whereas the transition metal disilicide tends to show a slightly low melting point.

Among these, hafnium, zirconium and yttrium can be preferably used as the transition metal disilicide/silicon alloy for infiltration since the transition metal disilicide/silicon alloy has a low melting point, the transition metal disilicide has a high melting point, and the transition metal disilicide has relatively excellent oxidation resistance.

For example, in the case of a hafnium disilicide/silicon alloy containing 8 to 9 at % of hafnium, the melting point is decreased to about 1,330° C. at the lowest, and thus it becomes possible to decrease the melt infiltration temperature to about 1,380° C.

At this temperature, for example, even general silicon carbide fibers having an amorphous structure (Tyranno ZMI fibers and Lox-M fibers (trade names: Ube Industries, Ltd.)) or the like are applied as ceramic fibers, it becomes possible to significantly suppress the decrease in the strength of the fibers in the melt infiltration step.

By providing the entirety or a part of the pores that are present in the composite material substrate with free carbon prior to the melt infiltration, for example, when the pores are melt-infiltrated with the hafnium disilicide/silicon alloy containing 8 to 9 at % of hafnium, the silicon in the alloy reacts with the free carbon present in the pores to generate silicon carbide, whereas the reaction amounts of the hafnium and free carbon in the alloy is relatively small, and thus the amount of the hafnium in the hafnium disilicide/silicon alloy changes little.

Therefore, the silicon on the hafnium disilicide/silicon alloy decreases, and the melting point in the hafnium disilicide/silicon alloy consequently increases according to the phase diagram shown in FIG. 1.

It is also possible to bring the melting point of the residual hafnium disilicide/silicon alloy after the infiltration close to the melting point ($T_{mp2}$) of hafnium disilicide by suitably adjusting the amount of the free carbon, the infiltration temperature and the infiltration time, and the melting point of the residual hafnium disilicide/silicon alloy can be increased to about 1,400° C. that is the melting point of silicon.

EXAMPLES

Next, the process for the production of a ceramic fiber-reinforced composite material and the ceramic fiber-reinforced composite material produced according to the present process will be explained in more detail.

As the ceramic fibers, amorphous silicon carbide fibers formed of a chemical composition of Si—Zr—C—O (Tyrrano ZMI fiber (trade name: Ube Industries, Ltd.) which had been woven into an orthogonal three-dimensional woven fabric having a shape of about 120 mm×120 mm×4 mm was used as a preform.

The fiber volume fractions of the woven fabric are 20%, 20% and 0.3%, respectively, in the X, Y and Z directions.

A carbon layer having a thickness of about 0.1 to 0.3 μm was first formed on the fiber surface on the preform of the amorphous silicon carbide fibers by a chemical vapor deposition process (CVI process) using propane ($C_3H_8$).

Furthermore, SiC having a thickness of 5 to 10 μm was deposited on the fiber surface by a CVI process using silicon tetrachloride ($SiCl_4$) and propane ($C_3H_8$) to form a matrix, to thereby form a composite material substrate that is a premolded product. The composite material substrate has a bulk density of about 1.8 g/cc and a pore rate of about 25%.

The composite material substrate that had been preformed in this way was cut into about a width of 30 mm×a thickness of 4 mm×a length 50 mm and used as a sample, and the powders of the transition metal disilicide/silicon alloys having the respective composition shown in Examples 1 to 4 in the following Table 2 were each applied thereto by using a spray glue (Spray Glue 77 (trade name: manufactured by 3M)).

The powder was applied five times to every surface of the sample, and the sample to which the transition metal disilicide/silicon alloy had been applied was put into a carbon crucible and heated in vacuum by using a carbon heater furnace to infiltrate the pores in the composite material substrate with the transition metal disilicide/silicon alloy to give a ceramic fiber-reinforced composite material (Examples 1 to 4).

The temperatures for the infiltration treatment were each preset to a temperature that is about 50° C. higher than the melting point, as shown in the following Table 2, and the heat treatment time was 1 hour.

Furthermore, an example in which the infiltration treatment with the infiltrating material was not conducted (Comparative Example 1), an example in which silicon was melt-infiltrated in vacuum at 1, 470° C. (Comparative Example 2), and an example in which silicon was melt-infiltrated in vacuum at 1, 430° C. (Comparative Example 3) were defined as comparative examples.

TABLE 2

|  | Free carbon in pores | Content ratio of infiltrating material (at %) | Impregnation tempreature (° C.) | Matrix composition after infiltration (pore parts) |
|---|---|---|---|---|
| Comparative Example 1 | None | (Impregnation material was absent) | | |
| Comparative Example 2 | None | Si (100) | 1470 | Si |
| Comparative Example 3 | None | Si (100) | 1430 | Si |
| Example 1 | None | Si (92)—Hf (8) | 1380 | $HfSi_2$ + Si |
| Example 2 | None | Si (88)—Hf (12) | 1380 | $HfSi_2$ + Si |
| Example 3 | None | Si (88)—Zr (12) | 1420 | $ZrSi_2$ + Si |
| Example 4 | None | Si (86)—Y(14) | 1310 | $YSi_2$ + Si |
| Example 5 | None | Si (85)—Ti (15) | 1380 | $TiSi_2$ + Si |
| Example 6 | None | Si (93)—Ta (7) | 1420 | $TaSi_2$ + Si |
| Example 7 | Present (carbon black) | Si (88)—Hf (12) | 1420 | $HfSi_2$ + Si + SiC |
| Example 8 | Present (phenol resin char) | Si (88)—Hf (12) | 1420 | $HfSi_2$ + Si + SiC |

A bending test piece of 4×4×length 50 mm was processed from each ceramic fiber-reinforced composite material, and bending tests and measurements of pore rates at 1,200° C. and 1,300° C. under room temperature in argon were conducted.

Furthermore, a sample of 4×4×4 mm was cut out, and the change in the weight by oxidation was measured by a thermal gravimetry in the air.

The measurement conditions were an airflow amount of 100 mL/min and a temperature raising velocity of 10° C./min, and the temperature was retained at 1,200° C. for 5 hours and the change in the weight during that time (increase in amount by oxidation) was measured.

The obtained results are shown in the following Table 3.

TABLE 3

| | Density (g/cc) | Pore rate (vol. %) | Room temperature | Bending strength (MPa) 1200° C. | 1300° C. | Increase in amount by oxidation (mg/mm²) |
|---|---|---|---|---|---|---|
| Comparative Example 1 | 1.80 | 24.1 | 253 | 172 | 124 | 0.06 |

TABLE 3-continued

|  | Density (g/cc) | Pore rate (vol. %) | Bending strength (MPa) | | | Increase in amount by oxidation (mg/mm²) |
| --- | --- | --- | --- | --- | --- | --- |
|  |  |  | Room temperature | 1200° C. | 1300° C. |  |
| Comparative Example 2 | 2.45 | 2.9 | 85 | 45 | 38 | 0.06 |
| Comparative Example 3 | 2.10 | 16.7 | 140 | 65 | 35 | 0.06 |
| Example 1 | 2.60 | 3.4 | 250 | 188 | 162 | 0.02 |
| Example 2 | 2.75 | 2.0 | 255 | 197 | 175 | 0.02 |
| Example 3 | 2.55 | 1.8 | 180 | 160 | 142 | 0.05 |
| Example 4 | 2.50 | 2.6 | 245 | 185 | 162 | 0.01 |
| Example 5 | 2.45 | 3.1 | 249 | 175 | 151 | 0.06 |
| Example 6 | 2.62 | 2.2 | 170 | 146 | 121 | 0.07 |
| Example 7 | 2.65 | 2.0 | 242 | 206 | 181 | 0.02 |
| Example 8 | 2.60 | 3.9 | 248 | 210 | 175 | 0.02 |

In Comparative Example 1 in which the infiltration treatment with the infiltrating material was not conducted, the pore rate was high as 24.1%, whereas the bending strength was a tolerable value of about 253 MPa.

In Comparative Example 2 in which the sample was melt-infiltrated with silicon (Si: 100%) under vacuum at 1,470° C., the bending strength was decreased to 85 MPa in accordance with the decrease in the strength due to thermal decomposition of the ceramic fibers during the infiltration treatment.

In the case of Comparative Example 3 in which the infiltration temperature was set to 1,430° C. that is slightly higher than the melting point of silicon (1,414° C.) so as to suppress the decrease in the strength of the ceramic fibers, the pore rate was slightly high as about 16.7% due to the high viscosity of the molten silicon, i.e., infiltration could not be sufficiently conducted.

Furthermore, even the heat treatment temperature was decreased to 1,430° C., slight decrease in the strength due to thermal decomposition of the ceramic fibers was also observed.

On the other hand, in either of Examples 1 to 4 of the present invention, since the melt infiltration temperature could be suppressed to 1,400° C. or less, thermal decomposition of the ceramic fibers was significantly suppressed, and thus a ceramic fiber-reinforced composite material having a high bending strength could be obtained.

Furthermore, the pore rate was 4% or less at the most and thus the infiltration property was extremely fine. Specifically, it is understood that, in the cases of the transition metal disilicide/silicon alloys containing hafnium and yttrium, respectively, the increase in amount by oxidation at 1,200° C. is also decreased, and thus materials also having excellent oxidation resistance can be obtained.

As Example 5 in the present invention, a pre-formed composite material substrate as in the above-mentioned Examples 1 to 4 was subjected to a vacuum infiltration treatment and a dry-curing treatment at 120° C., by using an aqueous solution containing 19.2 wt % of carbon black had been dispersed therein (Aqua-Black 162 (trade name: Tokai Carbon Co., Ltd.)) to which 0.5 wt % of an acrylic resin-based binder (Merposol (trade name: Matsumoto Yushi-Seiyaku Co., Ltd.) had been added.

These vacuum infiltration/drying/curing treatments were repeatedly conducted five times to thereby disperse carbon black in the pores to give a composite material substrate, and the composite material substrate was melt-infiltrated with a hafnium disilicide/silicon alloy having a composition of Si (88 at %)-Hf (12 at %) in vacuum at 1,380° C. to give a ceramic fiber-reinforced composite material.

Figure 2:
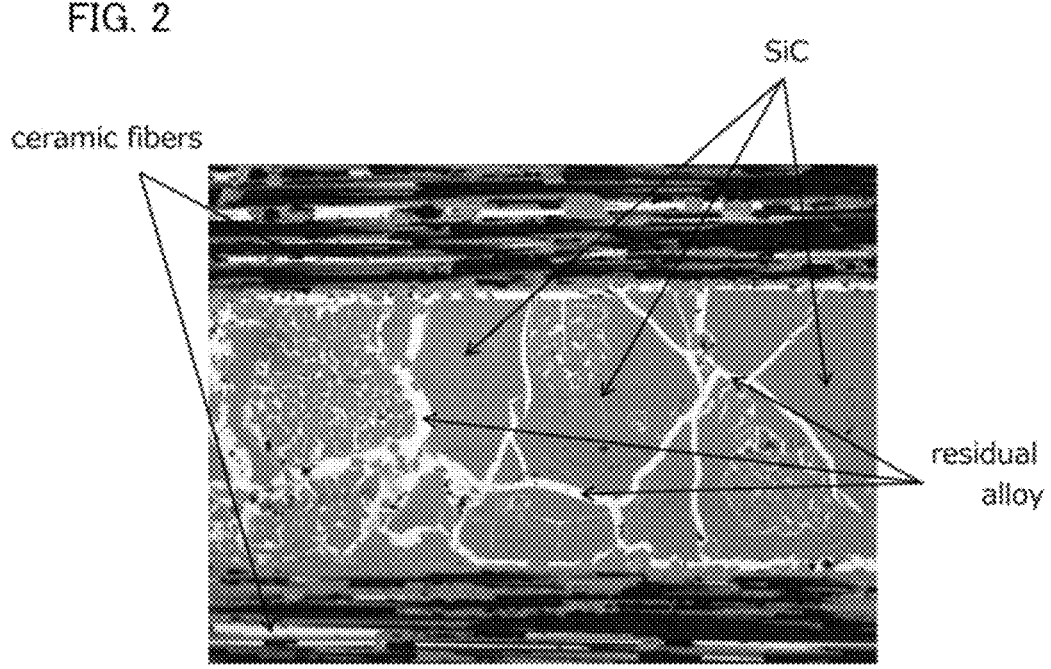
FIG. 2 is the micrograph of the cross-sectional surface of the ceramic fiber-reinforced composite material of the present invention.

FIG. 2 is the micrograph of the cross-sectional surface of the obtained ceramic fiber-reinforced composite material.

Most of the pores became SiC that was generated by the reaction between the filled carbon and the silicon in the melt-infiltrated hafnium disilicide/silicon alloy, and the gaps thereof were filled with the residual hafnium disilicide/silicon alloy.

As a result of an analysis of the crystal phase of this by an X-ray diffractometry, the peak of $HfSi_2$ was not changed whereas the peak of metallic Si was extremely small.

Furthermore, the peak of crystalline SiC was significantly increased, whereas the peak of HfC was observed little.

Accordingly, it was found that a considerable part of Si in the hafnium disilicide/silicon alloy became SiC by the reaction with the free carbon in the pores, and most of the hafnium disilicide/silicon alloy phase remaining in the material was $HfSi_2$.

Furthermore, no decrease in the bending strength due to metal infiltration was observed, and thus a fine composite material could be obtained.

As Example 6 in the present invention, a pre-formed composite material substrate as in the above-mentioned Examples 1 to 4 was soaked in a solution obtained by diluting a novolak-type phenol resin (J-325 (trade name: DIC Corporation)) with a solvent (methyl alcohol) at a ratio of 1:1, vacuum deaeration for about 24 hours was conducted to infiltrate the pores with the phenol resin, the solvent was removed in a vacuum drier at 100° C. for 5 hours, and the phenol resin was cured in the air at 160° C.

These vacuum infiltration/drying/curing treatments were repeatedly conducted four times, and a heat treatment at 800° C. for 1 hour in an argon atmosphere was conducted to thereby carbonize the phenol resin to give a composite material substrate having pores containing carbon, and the composite material substrate was melt-infiltrated with a hafnium disilicide/silicon alloy having a composition of Si (88 at %)-Hf (12 at %) in vacuum at 1,380° C. to give a ceramic fiber-reinforced composite material.

Also in this Example 6, a ceramic fiber-reinforced composite material having an excellent bending strength and contains a small amount of the residual hafnium disilicide/silicon alloy could be obtained as in Example 5.

The ceramic fiber-reinforced composite material of the present invention can prevent the alloy as the infiltrating material, and the like from melting at a high temperature and partially scattering to thereby inhibit the oxidation resistance, and thus is preferable for, for example, movable parts that are used under high temperatures such as moving blades in gas turbines, and also exerts excellent performances in any use such as improvement of bending strength and improvement of anticorrosive property.

What is claimed is:

1. A process for producing a ceramic fiber-reinforced composite material that is formed by infiltrating the entirety or a part of pores that are present in a composite material substrate obtained by forming ceramic fibers into a composite with a matrix formed of an inorganic substance, with an infiltrating material, wherein the composite material substrate consists of silicon carbide fibers having an amorphous structure, and free carbon that is present in the entirety or a part of pores that are present in the amorphous structure, and the infiltrating material is an alloy having a composition that is constituted by a disilicide of at least one or more transition metal among transition metals selected from scandium, yttrium, titanium, zirconium, hafnium, and tantalum, and silicon as the remainder, has a silicon content ratio, including the silicon in the transition metal disilicide, of 66.7 at % or more and less than 90.0 at % and gives a melting point that is lower than that of a single body of silicon, and the process consists of melt-infiltrating the pores that are present in the composite material substrate with the infiltrating material at a temperature that is equal to or more than the melting point of the alloy as the infiltrating material and that is less than 1,400° C., wherein the alloy as the infiltrating material reacts with the free carbon in the pores during the melt infiltration to generate silicon carbide and a carbide of the transition metal.

2. The process for producing a ceramic fiber-reinforced composite material according to claim 1, wherein the melting point of the residual alloy that is solidified in the pores after the melt infiltration is higher than the melting point of the alloy as the infiltrating material prior to the melt infiltration.

3. The process for producing a ceramic fiber-reinforced composite material according to claim 1, wherein the silicon carbide fibers of the amorphous structure are woven into an orthogonal three-dimensional woven fabric, wherein fiber volume fractions of the woven fabric are 20%, 20% and 0.3%, respectively, in the X, Y and Z directions.

\* \* \* \* \*